United States Patent [19]
Moore et al.

[11] Patent Number: 4,822,856
[45] Date of Patent: Apr. 18, 1989

[54] PREPARATION OF POLYMERIC BLEND STOCK

[75] Inventors: Eugene R. Moore; Wen H. Tong, both of Midland, Mich.

[73] Assignee: The Dow Chemical Company, Midland, Mich.

[21] Appl. No.: 16,022

[22] Filed: Feb. 18, 1987

[51] Int. Cl.[4] ............... C08L 27/06; C08L 37/00; C08L 51/04; C08L 71/04
[52] U.S. Cl. .................... 525/197; 525/66; 525/68; 525/74; 525/75; 525/78; 525/80; 525/85; 525/86; 525/152; 525/178; 525/211; 525/221; 525/232; 525/239; 525/240; 525/905
[58] Field of Search ............ 523/330; 525/197, 80, 525/85, 86, 66, 68, 74, 75, 78, 152, 178, 239, 211, 221, 232, 240

[56] References Cited

U.S. PATENT DOCUMENTS 3,864,432  2/1975  Adler et al. .............. 525/197
3,953,389  4/1976  Holeday et al. .......... 523/330

Primary Examiner—Jacob Ziegler
Attorney, Agent, or Firm—Douglas N. Deline

[57] ABSTRACT

A process for preparing a polymeric blend stock comprising fluidizing a first particulated polymer, contacting the particulated polymer with droplets of a latex of a second polymer or polymer mixture, retaining the resulting product in a fluid state under conditions sufficient to dry the latex, and recovering the resulting dried polymeric blend stock.

9 Claims, 1 Drawing Sheet

PREPARATION OF POLYMERIC BLEND STOCK

BACKGROUND OF THE INVENTION

The present invention relates to a process for drying synthetic resinous latexes utilizing a fluidizedbed. More particularly, the present invention relates to a method for preparing a polymeric blend stock, wherein one of the polymeric components is recovered in a dry form from a latex thereof by contacting droplets thereof with a fluidized bed of particles of the remaining polymeric component of the blend stock. The mixture thereafter may suitably be melted to achieve a desired polymeric blend. The present invention additionally embodies an apparatus suitable for the preparation of such a polymeric blend stock.

It is previously known to prepare thermoplastic resins by emulsion or suspension processes to thereby achieve a thermoplastic resinous product in a latex form. Suitable thermoplastic polymers include homopolymers and copolymers usefully employed as elastomeric impact modifiers, compatibilizers, or hard resinous components of polymeric blends. Previously, such latexes are dried to form a powder typically by a spray process. Although spray drying results in a suitable product for preparation of blends and eliminates a tendency of the latex to coagulate and stick into an intractable mass during the drying process, the process is difficult to operate in a commercial manner. Typically, a spray dryer requires expensive equipment which is subject to several serious shortcomings. Typically, a cyclone separator, a filter such as a bag house filter, and a final water scrubber are required to recover the spray dried product. Each of these components is subject to maintenance requirements and generates a certain amount of product loss. For example, filtration can result in losses of about 4 or 5 percent of the final product. In addition, periodic cleaning is often necessary to remove deposits from the equipment. Moreover, spray drying creates a very fine dust and the ever present danger of an explosion. Thus, spray drying equipment normally requires special handling precautions to avoid the generation of such dust and preferably the use of an inert atmosphere, thereby adding to the expense and complexity of the spray drying process.

When used ultimately in the preparation of a polymeric blend, the fine powdery polymeric product resulting from drying of a latex creates further handling problems. Besides the ever present dust, necessitating special handling procedures to prevent the dust from entering the atmosphere, clumping or settling of the finely particulated dried latex can result in uneven melt blending of the resulting polymer blend and ultimately variations in the composition of the resulting polymeric blend. Moreover, generation of the ultimate blend requires careful metering of the polymeric ingredients in a separate process operation.

It would be desirable to provide a process for drying a latex of a thermoplastic polymer which avoids sticking or coagulation of the dried latex as well as the problems created by spray drying of finely particulated polymer products.

It would also be desirable to provide a process for preparing a polymeric blend stock providing greater control over the uniformity thereof and eliminating dust handling problems.

In addition it would be desirable to provide a process for preparing polymeric blend stocks in a simple and expeditious manner.

Finally, it would be desirable to produce a polymeric blendstock comprising particles comprising an inner region of a first polymer and a second region comprising a different polymer or mixture thereof disposed on the outer surface of the first polymeric region.

SUMMARY OF THE INVENTION

Figure 1:
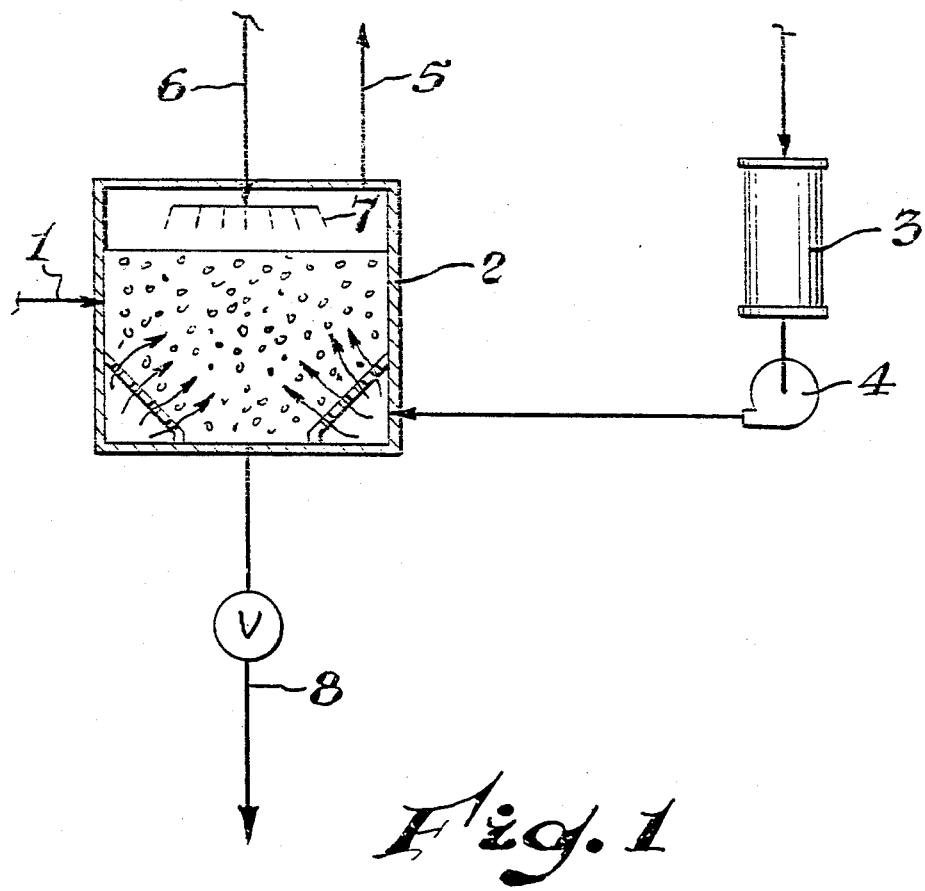
FIG. 1 illustrates in schematic form the operation of fluidized bed dryer of the present invention.

According to the present invention, there is now provided a process for preparing a polymeric blend stock comprising fluidizing a first particulated polymer or polymer mixture by use of a heated gaseous fluidizing medium, contacting the fluidized particulated polymer or polymer mixture with droplets of a latex of a second polymer or polymer mixture, retaining the resulting product in a fluidized state under conditions sufficient to dry the latex, and recovering the resulting dried polymeric blend stock.

The resulting blend stock may be melt blended with or without addition of further components, either polymeric or otherwise. Alternatively, the blend stock may be packaged and transported and used by the ultimate consumer by blending additional polymeric or other components therewith and melt blending to achieve a desired final polymeric blend. Thereafter, the resulting polymeric blend may be melted and injection molded or otherwise utilized as is well known in the art.

DETAILED DESCRIPTION OF THE INVENTION

The polymeric components employed in the preparaton of the blend stock of the present invention include any polymers suitably employed in a blend, with or without the addition of a compatibilizing agent with the proviso that one of the polymeric components of such blend stock is provided in a latex form. Examples of suitable polymers for use in the preparation of such a blend stock as either the particulated polymer or the latex polymer include homopolymers of monovinylidene aromatic monomers and copolymers thereof with copolymerizable comonomers such as ethylenically unsaturated carboxylic acids and esters thereof or ethyienically unsaturated nitriles such as acrylonitrile, $C_{1-4}$ alkyl acrylates and methacrylates, maleic anhydride, etc.: homopolymers of vinyl chloride and vinylidene chloride as well as copolymers thereof with each other or with copolymerizable comonomers, such as $C_{1-4}$ alkyl acrylates and methacrylates, etc: polycarbonates, polyarylene ethers such as polyphenylene ether: polyamides: polyolefins such as polyethylene, polypropylene, copolymers of ethylene and $\alpha$-olefins, ethylene acrylic acid copolymers, etc.: and any other suitable thermoplastic polymer. Preferred polymers are homopolymers of styrene or copolymers of styrene with acrylonitrile, methylmethacrylate or maleic anhydride. Such polymer is employed in a particulated form in the preparation of the invented polymeric blend stock. Suitably particle sizes from about 50 microns to about 10 millimeters in diameter may be employed.

The particulated polymer is caused to be fluidized in a fluidized bed utilizing a heated gaseous fluidizing medium. Suitable fluidized beds are well known in the art and can include a means for continuously ously adding particulated polymer and withdrawing therefrom the recovered polymeric blend stock. Suitably the heated gaseous fluidizing medium is passed through a closed container of the particulated polymer at a rate sufficient to obtain continuous motion and suspension of the particulated polymer. The gaseous medium may be any suitable material and need not be inert. A preferred gaseous medium is air. The gaseous medium is heated to a temperature suitable for evaporating the water contained in the latex. Suitable temperatures are from about 60° C. to about 110° C., preferably from about 80° to about 100° C.

The latex suitably comprises a polymer which may be used to prepare a blend with the particulated polymer or polymer mixture. Desirably, the polymer latex comprises the reaction product of an emulsion, suspension, mass-emulsion, or mass-suspension polymerization process. Particularly desired latex polymers include the well known grafted rubbery polymers prepared by the polymerization of a suitable grafting monomer in the presence of an emulsion of a rubbery polymer. Examples include grafted rubbery diene polymers and copolymers such as homopolymers of butadiene and copolymers thereof with styrene, methylmethacrylate, or mixtures thereof: ethylene propylene copolymers (EP): ethylene propylene diene terpolymers (EPDM): or acrylate rubbers. Suitable graft polymers include homopolymers of vinyl aromatic monomers or copolymers thereof with ethylenically unsaturated nitriles, carboxylic acids, or esters of carboxylic acids having up to about 12 carbons. A preferred latex comprises a butadiene rubber having grafted thereto styrene or styrene acrylonitrile copolymer. Particularly preferred are such latexes having a rubber content above about 55 percent based on total solids weight. Generally the latexes have particle sizes from about 0.08 to about 3.0 microns.

Suitably the latex is sprayed or injected or otherwise atomized and caused to form droplets within the fluidized bed containing the particulated polymer or polymer mixture. Suitable atomizing means include atomizing nozzles or rotating disk type atomizers. A sufficient volume of fluidized bed is employed to ensure that substantially all of the latex contacts the particulated polymer and adheres thereto and does not instead adhere to the wall surfaces of the fluidized bed. It has been found that the present method allows for drying or evaporation of the water from the latex and the formation of at least a partial coating of the resulting polymer on the surfaces of the particles of the fluidized bed. Due to the agitation provided by the fluidizing medium, the particulates have been found to remain separate and not to adhere to one another while at the same time water is effectively removed from the latex. The product which comprises an inner region of a first polymer and a second region comprising a different polymer disposed on the outside surface of the inner region is recovered by any suitable means such as discontinuing the drying process, or by continuously removing a polymeric blend stock from the fluidized bed.

The method of the invention is now more particularly described with reference to the apparatus disclosed in FIG. 1. In the Figure, there is depicted a source of particulated polymer, 1, in operative communication with a fluidized bed, 2, operating under fluidizing conditions. Air or other suitable fluidizing medium is drawn through a heater, 3, by blower, 4, and injected into the fluidized bed exiting by means of the exhaust, 5. A latex is provided via supply line 6 in operative communication with a suitable aperture or atomizing device, 7, located within the fluidized bed. The resulting polymeric blend stock may be removed either continuously or discontinuously via discharge means, 8.

EXAMPLES

Having described the invention, the following example is provided as further illustrative and is not to be construed as limiting. Where presented, parts, ratios and percentages are expressed in weight.

EXAMPLE 1

A grafted rubber latex prepared by grafting a mixture of 70 percent styrene and 30 percent acrylonitrile onto a polybutadiene rubber core having an average rubber particle size of 0.12 microns is prepared by standard emulsion polymerization. The resulting latex having 25 percent solids content which is 65 percent by weight rubber is sprayed into a fluidized bed filled with granules of 70/30 styrene/acrylonitrile copolymer. The bed is retained in a fluid state by injection of air at 85° C. The air passes upwards through the fluidized bed at a rate sufficient to cause suspension of the particulated styrene/acrylonitrile copolymer. A coarse spray of the latex is directed downward from a spray nozzle into the fluidized bed until approximately 50 percent latex solids is added. The resulting product is dry to the touch and uniformly coated with grafted rubber. The resulting SAN/grafted rubber blend stock is easily handled and conveyed without generating significant amounts of dust or airborn particulated polymer. The polymeric blend stock is melt extruded utilizing a Welding Engineers, 1.5 inch, twin screw extruder to produce a tough ABS type resin which is usefully employed for moldings and extrusions.

What is claimed is:

1. A process for preparing a polymeric blend stock comprising fluidizing a first particulated polymer or polymer mixture by use of a heated gaseous fluidizing medium contacting the fluidized particulated polymer or polymer mixture with droplets of a latex of a second polymer or polymer mixture, retaining the resulting product in a fluidized state under conditions sufficient to dry the latex, and recovering the resulting dried polymeric blend stock.

2. A process according to claim 1, wherein the particulated polymer comprises a homopolymer of styrene or a copolymer thereof with acrylonitrile, methylmethacrylate, or maleic anhydride, a homopolymer of vinylchloride or a copolymer thereof with a $C_{1-4}$ acrylate or methacrylate.

3. A process according to claim 1, wherein the fluidizing medium comprises air.

4. A process according to claim 1, wherein the fluidizing medium is heated to a temperature from about 60° to about 110° C.

5. A process according to claim 4, wherein the fluidizing medium is heated to a temperature from about 80° to about 100° C.

6. A process according to claim 1, wherein the latex comprises grafted particles of a rubbery polymer.

7. A process according to claim 1, wherein the latex comprises polymer particles having a particle size from about 0.08 to about 3.0 microns.

8. A process according to claim 1, wherein the latex is formed into droplets by atomization through an atomizing nozzle, or a rotating disk-type atomizer.

9. A polymeric blend stock prepared according to claim 1.

* * * * *